United States Patent [19]

Komaba et al.

[11] 4,032,136
[45] June 28, 1977

[54] FEED CASSETTE

[75] Inventors: Shiro Komaba; Yoshitomo Goshima, both of Kawasaki, Japan

[73] Assignee: Canon Kabushiki Kaisha, Tokyo, Japan

[22] Filed: Sept. 11, 1975

[21] Appl. No.: 612,479

Related U.S. Application Data

[63] Continuation of Ser. No. 454,843, March 26, 1974, abandoned.

[30] Foreign Application Priority Data

Apr. 6, 1973 Japan .............................. 48-39246

[52] U.S. Cl. .............................. 271/160; 271/127; 271/170; 271/171
[51] Int. Cl.² ...................... B65H 1/12; B65H 3/56
[58] Field of Search .......... 271/160, 171, 170, 127, 271/118, 169, 164

[56] References Cited

UNITED STATES PATENTS

| | | | |
|---|---|---|---|
| 3,599,972 | 8/1971 | Miciukiewicz | 271/127 |
| 3,672,665 | 6/1972 | Schnall et al. | 271/164 |
| 3,689,064 | 9/1972 | Kuksa | 271/127 X |
| 3,767,187 | 10/1973 | Mahler et al. | 271/169 |
| 3,806,112 | 4/1974 | Melby et al. | 271/127 X |
| 3,873,196 | 3/1975 | Ogawa | 271/170 X |
| 3,905,697 | 9/1975 | Komori et al. | 271/160 X |

FOREIGN PATENTS OR APPLICATIONS

| | | | |
|---|---|---|---|
| 350,365 | 3/1922 | Germany | 271/171 |

*Primary Examiner*—Evon C. Blunk
*Assistant Examiner*—Bruce H. Stoner, Jr.
*Attorney, Agent, or Firm*—Fitzpatrick, Cella, Harper & Scinto

[57] ABSTRACT

A feed cassette for use with copying machines or the like comprises two separate inner plates for supporting thereon a stack of copy mediums. One of the two inner plates is pivotable and the other inner plate is pivotable and normally biased upwardly by spring means to raise the copy mediums at the leading end edge thereof. A side plate serves to position the copy mediums in accordance with the sizes thereof and is slidable with the other inner plate along a guide plate. A limit plate is provided for positioning the copy mediums in accordance with the sizes thereof and is slidable on the other inner plate along a guide plate.

6 Claims, 4 Drawing Figures

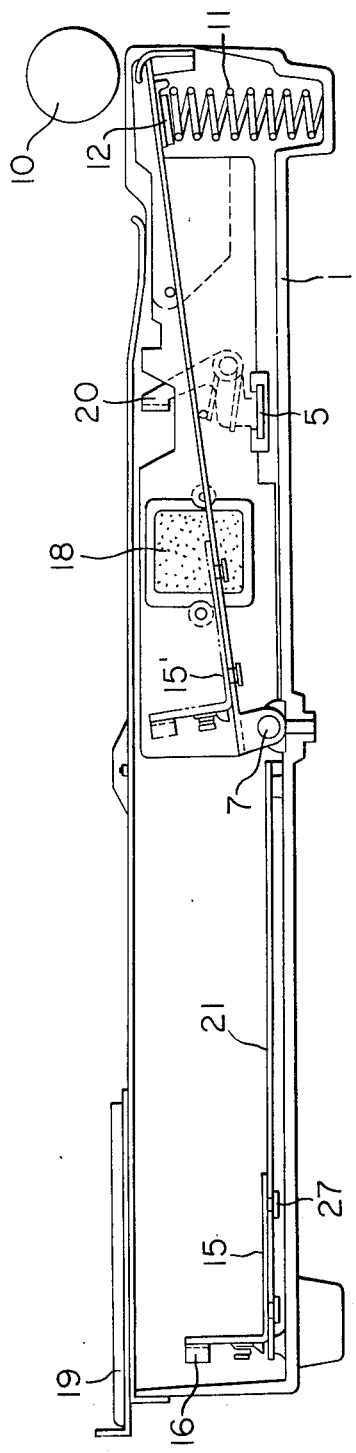

FEED CASSETTE

This is a continuation, of application Ser. No. 454,843 filed Mar. 26, 1974, now abandoned.

BACKGROUND OF THE INVENTION

1. Field of the Invention

This invention relates to a feed cassette for containing therein copy mediums or the like, and more particularly to such a feed cassette which singly is capable of feeding various sizes of copy mediums.

2. Description of the Prior Art

In copying machines or the like, a cassette system has recently been proposed to enhance the efficiency and speed of the office work. The conventional system has been such that particular cassettes are required to contain particular sizes of copy mediums and in use, any desired one of three cassettes loaded with copy mediums may be inserted into a feed device in a copying machine or the like. Such a system has been efficient in that replacement of copy mediums can be readily done by replacement of the cassette, but it has been undesirable in that a variety of cassettes must be prepared for various sizes of copy mediums, and this has led to the need to provide a space for the storage of spare cassettes, which has, in turn, offered disadvantages with respect to moisture-proof effects.

SUMMARY OF THE INVENTION

It is therefore an object of the present invention to provide a feed cassette which singly is capable of feeding various sizes of copy mediums.

It is another object of the present invention to provide a feed cassette in which a side plate is movable in accordance with various sizes of copy mediums.

It is still another object of the present invention to provide a feed cassette in which a limit plate is movable in accordance with the lengths of copy mediums.

It is yet another object of the present invention to provide a feed cassette in which a limit plate is movable in accordance with different sizes of copy mediums and is removable from the cassette.

It is a further object of the present invention to provide a feed cassette in which a side plate or a limit plate can be set to a predetermined position in accordance with the sizes or lengths of the copy mediums.

In order that different sizes of copy mediums may be fed by a feed cassette of the type, on which an inner plate supporting thereon copy mediums or the like is normally biased upwardly by compression springs to permit the copy mediums to be fed one by one, it is necessary that a side plate be movable to match the sizes or widths of the copy mediums and that the inner plate supporting thereon the copy mediums be also movable in accordance with the copy mediums, or the like. Likewise, a limit plate must be movable to match the sizes or lengths of the copy mediums.

The present invention solves the above-noted problems. According to the present invention, the inner plate for supporting thereon copy mediums or the like is divided into two members and these two inner plate members are pivotably mounted on a side plate, which is slidable along a guide plate. A member spans compression springs provided within the cassette and is controlled to move vertically. The inner plate is movable by the upward force of the compression springs and under the guidance of said member and is slidable with the movement of the side plate so that the inner plate is movable without being interfered with by the compression springs. A limit plate movable to match the lengths of the copy mediums is removable from a slidable on the upper surface of guide plates provided in the inner plate and in the bottom plate of the cassette.

Thus, according to the present invention, a transverse side plate and a longitudinal limit plate are movable to thereby enable various sizes of copy mediums to be fed by a single cassette, and the necessity of preparing particular cassettes for particular sizes of copy mediums as was conventional is eliminated resulting in a great convenience.

According to the prior art, where it is desired to use various sizes of copy mediums, it has been necessary to prepare a corresponding variety of cassettes, whereas the present invention only requires a single cassette to be used for various sizes of copy mediums.

Also, if a copy medium container portion is installed within a copying machine and various sizes of copy mediums are selectively contained in such a container portion, it is possible to use such various sizes of copy mediums, but this involves a great deal of time for replacement of the copy mediums, because it is not of the cassette type. According to the present invention, if there is only one space cassette capable of containing various sizes of copy mediums, these different sizes of copy mediums can be simply loaded into a copying machine and thus, only two cassettes are enough to enable various sizes of copy mediums to be effectively used.

The invention will become more fully apparent from the following detailed description of some specific embodiments thereof taken in conjunction with the accompanying drawings.

BRIEF DESCRIPTION OF THE DRAWINGS

FIG. 4 is a cross-sectional view taken along lines IV — IV of FIG. 3.

DESCRIPTION OF THE PREFERRED EMBODIMENTS

Figure 1:
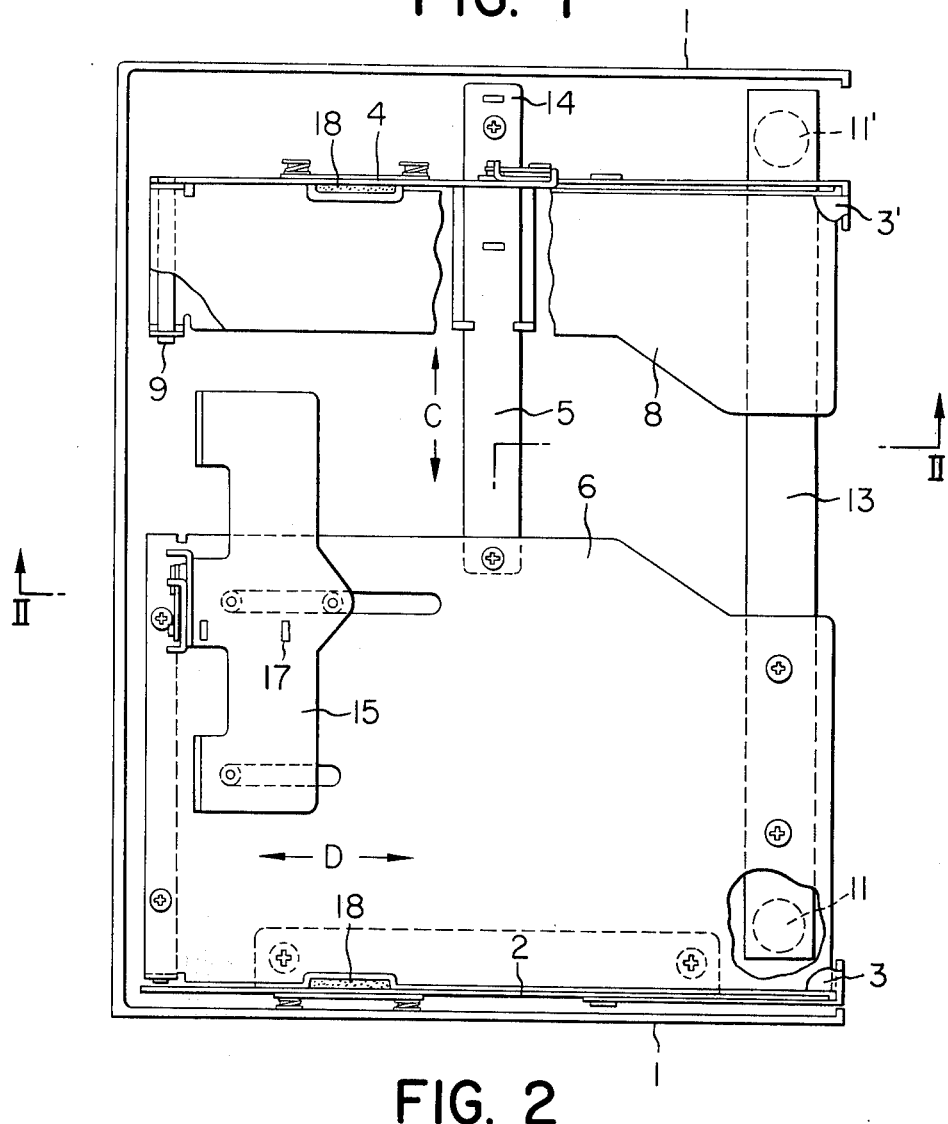
FIG. 1 is a plan view of the feed cassette according to an embodiment of the present invention.
Figure 2:
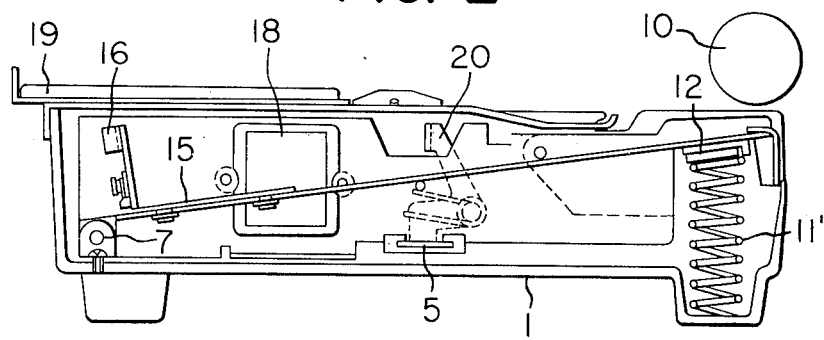
FIG. 2 is a cross-sectional view taken along lines II — II of FIG. 1.

Referring to FIGS. 1 and 2, the cassette of the present invention comprises a cassette body 1 and a reference side plate 2, which provides the reference for positioning copy mediums and which is secured to the cassette body 1. A separator pawl 3 for separating copy mediums one by one is pivotably mounted on the reference side plate 2, on the side thereof which is adjacent a feeder means 10 mounted within the body of a copying machine. The cassette further comprises a movable side plate 4, which is movable in the direction of the arrow C in accordance with the sizes of the copy mediums. The movable side plate 4 is slideable along a guide plate 5 provided substantially centrally of the cassette body, and a separator pawl 3; for separating copy mediums one by one, is pivotably mounted on the movable side plate 4 on that side thereof which is adjacent the aforesaid feed means 10. An inner plate 6, for supporting thereon a charge of copy mediums, is pivotable about a shaft 7 provided in the cassette body 1, and another inner plate 8 is also pivotable about a shaft 9 secured to the movable side plate 4 and is movable with such side plate 4. Compression springs 11 and 11' are provided within the cassette on that side thereof which is adjacent the feeder means, and a plate-like member 13, having spring seats 12 and 12' secured to the inner plate 6 by screws, spans the compression springs 11 and 11'. The inner plate 6 is vertically movable with the platelike member 13 and normally biased upwardly, for rotation about the shaft 7 by the springs 11 and 11', and into engagement with the separator pawls 3 and 3' so as to be stopped thereby. The portion of the inner plate 8 which is adjacent the feeder means 10 rests on the plate-like member 13 so as to be normally biased upwardly for rotation about the pivot 9 by the springs 11 and 11' through the agency of the plate-like member 13, and the inner plate 8 is slidable on the plate-like member 13 with the movement of the movable side plate 4.

The movable side plate 4 may be moved along the guide plate 5 in accordance with the sizes or widths of the copy mediums and may be locked by a stop plate 20, received in a corresponding rectangular opening 14 formed in the guide plate 5. A limit plate 15 movable in accordance with the sizes or lengths of the copy mediums is attached to the inner plate 6 and is movable in the direction of the arrow D. The limit plate 15 may be locked by a stop plate 16, received in a corresponding rectangular opening 17, formed in the inner plate 6. There is further provided a paper keep pad 18 for providing registration between the copy mediums and for separating them one by one, and a cover 19 is provided for the purpose of maintaining a moisture-proof and dust-proof cassette.

To charge the above-described cassette with copy mediums, the limit plate 15 is slid in the direction of the arrow D, in accordance with the size of the copy mediums to be inserted, until it is locked by the stop plate 16. Likewise, the movable side plate 4 is slid along the guide plate in the direction of the arrow C in accordance with the size of the copy mediums, until it is locked by the stop plate 20. Subsequently, a charge of copy mediums is placed on top of the inner plates 6 and 8 and these plates with the copy mediums are manually forced down nearly to the bottom of the cassette body 1 against the force of the compression springs 11 and 11', whereby the charge of copy mediums is received under the separator pawls 3 and 3'. Then, release of the manual force permits the plate-like member 13 and, accordingly, the inner plates 6 and 8 to be raised by the upward force of the springs 11 and 11' so that the charge of copy mediums is urged into contact with the underside of the separator pawls 3 and 3'. The copy mediums are now ready for feeding.

In the above-described embodiment, the reference side plate 2 is secured to the cassette body 1 and the movable side plate 4 is slidable along the guide plate 5, whereas it is also possible to make the plate-like member 13 vertically movable, independently, and to make the inner plate 6 pivotable with respect to the reference side plate 2 so that the plate-like member 13, with one end of the inner plate 6 resting on top thereof is slidable, and to make the reference side plate 2 slidable along a guide member to move the inner plate 6.

Figure 3:
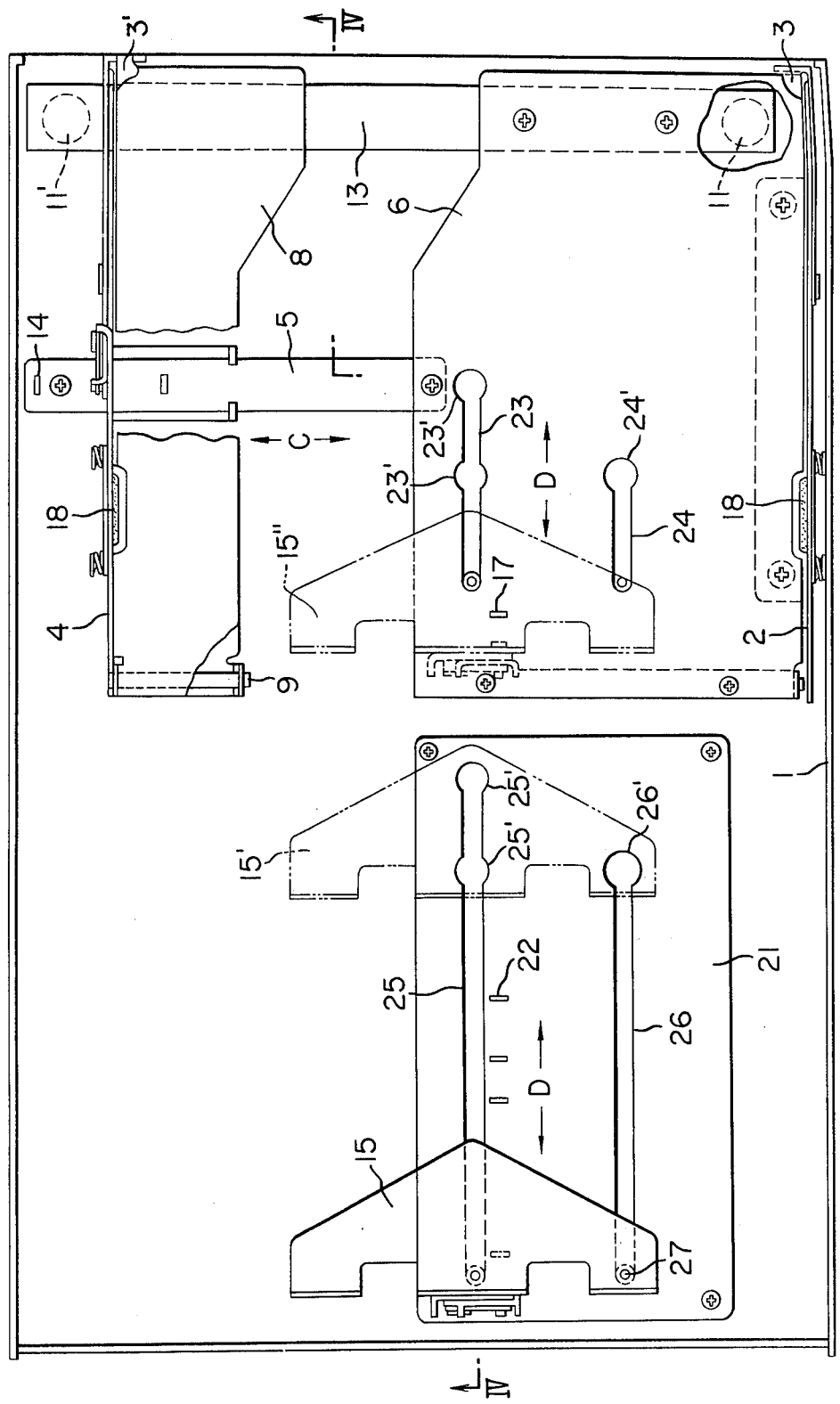
FIG. 3 is a plan view of the feed cassette according to another embodiment of the present invention.

FIGS. 3 and 4 show another embodiment of the present invention in which a cassette body 1 has secured thereto a reference side plate 2 which provides the reference for positioning copy mediums, and a separator pawl 3, for separating copy mediums one, by one is pivotably mounted on the reference side plate on the side thereof which is adjacent to feeder means 10, provided within the body of a copying machine. A movable side plate 4 is provided, which is movable in the direction of the arrow C in accordance with the sizes of the copy mediums, and is slidable along a guide plate 5 provided in the bottom of the cassette body. A separator pawl 3' for separating copy mediums one by one is pivotably mounted on the movable side plate 4 on the side thereof which is adjacent the feeder means 10. An inner plate 6 for supporting thereon a charge of copy mediums, is pivotable about a shaft 7 secured to the cassette body. Likewise, another inner plate 8 is also pivotable about a shaft 9, secured to the movable side plate 4, and is movable with such side plate 4.

Compression springs 11 and 11' are provided within the cassette on that side thereof which is adjacent the feeder means 10, and a plate-like member 13, having spring seats 12 and 12' secured to the inner plate 6 by screws, spans the compression springs 11 and 11'. The inner plate 6 is vertically movable with the plate-like member and normally biased upwardly for rotation about the shaft 7 by the springs 11 and 11' and into engagement with the separator pawls 3 and 3' so as to be stopped thereby.

The portions of the inner plate 8 which is adjacent the feeder means 10, rests on the plate-like member 13 so as to be normally biased upwardly for rotation about a pivot 9 by the springs 11 and 11' through the agency of the plate-like member 13, and the inner plate 8 is slidable on the upper surface of the plate-like member 13 with the movement of the movable side plate 4.

The movable side plate 4 may be moved along the guide plate 5 in accordance with the sizes or widths of the copy mediums and may be locked by a stop plate 20 received in a corresponding rectangular opening 14 formed in the guide plate 5. A limit plate 15, movable in accordance with the sizes or lengths of the copy mediums, is attached to the upper surface of the inner plate 6 or to a guide plate 21 and is movable in the direction of the arrow D. The limit plate 15 may be locked by a stop plate 16, received in a corresponding rectangular opening 17 or 22 formed in the inner plate 6 or in the guide plate 21.

As previously described, the limit plate 15 of the present invention, movable in the lengthwise direction of the cassette, may be attached to either the inner plate 6 or the guide plate 21. The inner plate 6 and the guide plate 21 are formed with limit plate guide slots 23, 24, 25 and 26 which cooperate with guide dowels 27, secured to the limit plate 15, to limit the movement of the limit plate. The guide slots 23, 24, 25 and 26 are provided with enlarged portions 23', 24', 25' and 26', respectively, so that the limit plate 15 may be removed from the inner plate 6 or the guide plate 21, when the guide dowels 27 of the limit plate arrive at the enlarged portions of the guide slots.

As is shown in FIGS. 3 and 4, the inner plate, for supporting thereon a stack of copy mediums, is not formed as a unitary construction, but about one-half of the inner plate, which is adjacent the feeder means 10, is made pivotable, whereby a constant load is applied to the inner plate irrespective of the lengths of the copy mediums. Thus, not only stable feed of copy mediums is ensured, but also mechanical strength is increased to improve the operating characteristics and the number of the components may be reduced by employing common parts, thereby reducing the cost of the entire cassette.

Reference numeral 18 designates a paper keep pad which is useful for providing registration between the copy mediums and to facilitate separation of the copy mediums one by one, and reference numeral 19 denotes a cover, serving the purpose of rendering the cassette moisture-proof and dust-proof.

To charge the above-described cassette with copy mediums, the limit plate 15 is slid in the direction of the arrow D in accordance with the size of the copy mediums to be inserted, until it is locked on the inner plate 6 or the guide plate 21 by the stop plate 16. Likewise, the movable side plate 4 is slid along the guide plate 5 in the direction of the arrow C in accordance with the size of the copy mediums until it is locked by the stop plate 20.

Subsequently, a stack of copy mediums is placed on top of the inner plates 6 and 8, and these plates, with the copy mediums, are manually forced down nearly to the bottom of the cassette body 1 against the force of the compression springs 11 and 11', whereby the stack of copy mediums is received under the separator pawls 3 and 3'. Then, release of the manual force permits the plate-like member 13, and accordingly the inner plates 6 and 8 to be raised by the upward force of the springs 11 and 11' so that the stack of copy mediums is urged into contact with the underside of the separator pawls 3 and 3'. The copy mediums are now ready for feeding.

Again, in the embodiment described just above, the reference side plate 2 is secured to the cassette body 1 and the movable side plate 4 is slidable along the guide plate 5, whereas it is also possible to make the plate-like member 13 vertically movable, independently, and to make the inner plate 6 pivotable with respect to the reference side plate 2 so that the plate-like member 13, with one end of the inner plate 6 resting on top thereof, is slidable, and to make the reference side plate 2 slidable along a guide member to move the inner plate 6.

We claim:

1. A feed cassette for sheets of copy material comprising:
   a cassette body having a feeding end past which copy material moves as it is fed from the cassette;
   two side plates mounted on said body, at least one of which is movable along said body toward and away from the other side plate to accommodate different sizes of copy material therebetween;
   two vertically movable separating pawls for separating the copy material as it is fed, said separating pawls being connected to said side plates for respectively engaging opposite corners of the copy material at the leading edge thereof adjacent to said feeding end of said body;
   inner plate means positioned between said side plates for supporting the copy material, said inner plate means including a plurality of inner plates, wherein said inner plates have ends disposed adjacent said feed end of said body, and extend rearwardly to support the copy material;
   means connecting one of said inner plates to said movable side plate for movement therewith in the direction of movement of said movable side plate while permitting said one inner plate to move independently with respect to said movable side plate in a vertical direction;
   means for mounting the remainder of said plurality of inner plates within said cassette to permit vertical movement of said inner plates;
   means mounted within said cassette for urging said ends of said inner plates upwardly, to thereby urge the leading edge of the uppermost sheet of copy material against said separating pawls; and
   means for maintaining said ends of said inner plates at substantially the same relative height;
   whereby, when said movable side plate is moved to accommodate a different size copy material, the associated separating pawl and inner plate are also moved so that copy material separation is effected uniformly regardless of the size of copy material used.

2. A feed cassette according to claim 1, further comprising:
   a limit plate for engaging the trailing edge of said copy material;
   means for adjustably mounting said limit plate on said inner plate means;
   another inner plate means positioned between said side plates, and being spaced from said feeding end and extending rearwardly from said inner plates; and
   means for adjustably mounting said limit plate on said another inner plate means;
   whereby said limit plate may be adjustably mounted on either of said inner plate means in order to accommodate various sizes of copy material.

3. A feed cassette according to claim 2, further comprising:
   lock means to lock said limit plate once it is adjustably mounted on one of said inner plate means.

4. A feed cassette according to claim 1, further comprising:
   a limit plate for engaging the trailing edge of the copy material; and
   means for adjustably mounting said limit plate on said inner plate means.

5. A feed cassette according to claim 4, further comprising:
   lock means to lock said limit plate once it is adjustably mounted on said inner plate means.

6. A feed cassette according to claim 1, further comprising:
   lock means to lock said movable side plate to said body once it has been adjustably positioned.

* * * * *

UNITED STATES PATENT AND TRADEMARK OFFICE
CERTIFICATE OF CORRECTION

PATENT NO. : 4,032,136
DATED : June 28, 1977
INVENTOR(S) : SHIRO KOMABA and YOSHITOMO GOSHIMA It is certified that error appears in the above-identified patent and that said Letters Patent are hereby corrected as shown below:

Col. 1, line 18, "three" should read --these--;

Col. 1, line 27, --and dust proof-- should be inserted before "effects";

Col. 2, line 3, "a" should read --and--;

Col. 2, line 4, "surface" should read --surfaces--;

Col. 2, line 26, "space" should read --spare--;

Col. 2, line 62, "3;" should read --3',--;

Col. 2, line 65, "feed means" should read --feeder means--;

Col. 4, line 26, "portions" should read --portion--.

Signed and Sealed this

Twentieth Day of September 1977

[SEAL]

Attest:

RUTH C. MASON
Attesting Officer

LUTRELLE F. PARKER
Acting Commissioner of Patents and Trademarks